(12) United States Patent
Hebel

(10) Patent No.: US 6,396,810 B1
(45) Date of Patent: May 28, 2002

(54) SYSTEM AND METHOD FOR ANALYZING COMMUNICATION PATHS IN A TELECOMMUNICATIONS NETWORK

(75) Inventor: Larry D. Hebel, Dallas, TX (US)

(73) Assignee: MetaSolv Software, Inc., Plano, TX (US)

( * ) Notice: Subject to any disclaimer, the term of this patent is extended or adjusted under 35 U.S.C. 154(b) by 0 days.

(21) Appl. No.: 09/393,444

(22) Filed: Sep. 8, 1999

(51) Int. Cl.[7] .................................................. H04J 1/16
(52) U.S. Cl. ...................................... 370/248; 370/254
(58) Field of Search ................................ 370/254, 255, 370/256, 257, 258, 248; 709/201, 223, 224, 238, 239, 240, 241, 244

(56) References Cited

U.S. PATENT DOCUMENTS

| | | |
|---|---|---|
| 5,276,789 A | 1/1994 | Besaw et al. ............... 395/140 |
| 5,394,522 A | 2/1995 | Sanchez-Frank et al. ... 395/159 |
| 5,671,355 A | 9/1997 | Collins ..................... 395/200.2 |
| 5,684,967 A | 11/1997 | McKenna et al. ........... 395/329 |
| 5,687,315 A | 11/1997 | Tezuka et al. ............ 395/200.1 |
| 5,751,962 A | 5/1998 | Fanshier et al. ........ 395/200.53 |
| 5,793,974 A | 8/1998 | Messinger ............. 395/200.54 |
| 5,809,265 A | 9/1998 | Blair et al. .................. 395/339 |
| 5,812,779 A | 9/1998 | Ciscon et al. .......... 395/200.53 |
| 5,821,937 A | 10/1998 | Tonelli et al. ............... 345/356 |
| 5,831,610 A | 11/1998 | Tonelli et al. ............... 345/335 |
| 5,831,618 A | 11/1998 | Fuji et al. .................... 345/356 |
| 5,838,907 A | 11/1998 | Hansen .................... 395/200.5 |
| 5,889,520 A | 3/1999 | Glaser ......................... 345/349 |
| 5,910,803 A | 6/1999 | Grau et al. .................. 345/357 |
| 5,933,601 A | 8/1999 | Fanshier et al. ........ 395/200.53 |
| 5,958,012 A | 9/1999 | Battat et al. ................. 709/224 |
| 5,966,128 A | 10/1999 | Savage et al. ............... 345/356 |
| RE36,444 E | 12/1999 | Sanchez-Frank et al. ... 345/349 |
| 6,009,466 A | 12/1999 | Axberg et al. .............. 709/220 |
| 6,018,769 A | 1/2000 | Tezuka et al. ............... 709/220 |
| 6,020,889 A | 2/2000 | Tarbox et al. ............... 345/356 |
| 6,118,762 A | 9/2000 | Nomura et al. ............. 370/230 |
| 6,144,641 A | * 11/2000 | Kaplan et al. ............... 370/238 |

FOREIGN PATENT DOCUMENTS

WO  WO 98/47265  10/1998  ........... H04L/12/24

OTHER PUBLICATIONS

Ishiwa, et al., "An Expert System for Planning Private Networks," XP 000468662, *NEC Research & Development*, Jul., 1994, 9 pages.

Fisher, et al., "Techniques for Automated Planning of Access Networks," XP 000584919, *BT Technology Journal*, Apr., 1996, 7 pages.

Michal Pióro, Robust Design Problems in Telecommunication Networks, XP–000883228, *Elsevier Science B.V.,* Jun., 1997, 10 pages.

International Search Report in International Application Ser. No. PCT/US 00/24574, dated Mar. 26, 2001, 8 pages.

Notification of Transmittal of International Preliminary Examination Report, 6 pages, Jun. 28, 2001.

\* cited by examiner

*Primary Examiner*—Melvin Marcelo
*Assistant Examiner*—Alexander O. Boakye
(74) *Attorney, Agent, or Firm*—Baker Botts L.L.P.

(57) ABSTRACT

A system for analyzing communication paths in a telecommunications network includes a memory and a processor. The memory stores network data relating to a plurality of circuits in a telecommunications network. The processor, coupled to the memory, receives target circuit information specifying two telecommunication locations and a rate code. The processor identifies one or more circuits associated with a defined boundary area and identifies one or more communication paths between the specified telecommunication locations. Each communication path includes one or more of the identified circuits that communicate information according to the rate code.

60 Claims, 11 Drawing Sheets

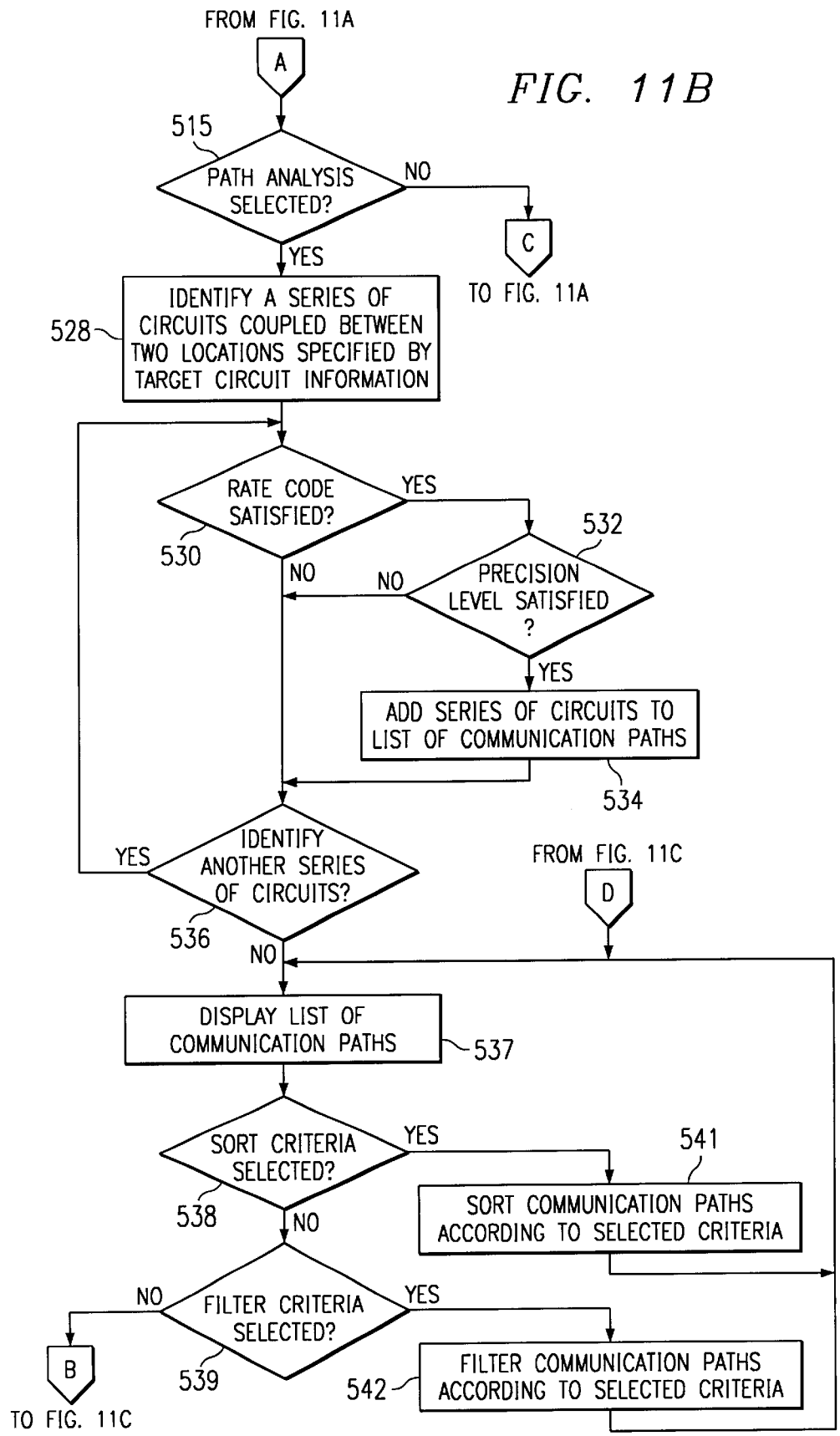

SYSTEM AND METHOD FOR ANALYZING COMMUNICATION PATHS IN A TELECOMMUNICATIONS NETWORK

TECHNICAL FIELD OF THE INVENTION

This invention relates generally to the field of telecommunications and, more particularly, to a system and method for analyzing communication paths in a telecommunications network.

BACKGROUND OF THE INVENTION

A telecommunications network generally includes several telecommunication locations coupled together by transmission lines that form circuits. Telecommunications providers devote considerable time and resources to establishing communication paths between remote locations using one or more circuits. To establish a communication path between two locations that are not directly coupled together by a single circuit, a telecommunications provider must identify a series of circuits that can communicate information between the two locations. By examining text-based information describing a telecommunications network, an individual, starting at one of the two locations, must manually follow a circuit from location to location until the individual either encounters the second of the two locations or an intermediate location without a circuit leading to a new location. If the individual encounters the second of the two locations, then the individual has traced a communication path between the two locations. If, however, the individual encounters an intermediate location without a circuit leading to a new location, the individual must start over by following an alternative circuit path from either the first location or a prior intermediate location. Unfortunately, this trial-and-error process consumes enormous time and resources, and even when successful at identifying a communication path, the process does not necessarily yield the most desirable path for communicating information between two locations. As telecommunications networks continue to grow in size and complexity, existing systems and methods for analyzing communication paths have become increasingly unsatisfactory.

SUMMARY OF THE INVENTION

In accordance with the present invention, a system and method for analyzing communication paths in a telecommunications network is provided that substantially eliminates or reduces disadvantages or problems associated with previously developed systems and methods.

In one embodiment, a system for analyzing communication paths in a telecommunications network includes a memory and a processor. The memory stores network data relating to a plurality of circuits in a telecommunications network. The processor, coupled to the memory, receives target circuit information specifying two telecommunication locations and a rate code. The processor identifies one or more circuits associated with a defined boundary area and identifies one or more communication paths between the specified telecommunication locations. Each communication path includes one or more of the identified circuits that communicate information according to the rate code.

In another embodiment, a program embodied in a computer-readable medium analyzes communication paths in a telecommunications network. The program includes a display component and a processing component. The display component generates a graphic representation of nodes and connectors. Each node represents a telecommunication location, and each connector, coupled between two of the nodes, represents one or more circuits coupled between telecommunication locations. The processing component receives target circuit information specifying two telecommunication locations and a rate code. The processing component identifies one or more communication paths between the specified telecommunication locations. Each communication path includes one or more circuits that communicate information according to the rate code.

The present invention provides a number of important technical advantages. Unlike previous techniques, the present invention provides a graphics window component that displays nodes and connectors that represent locations and circuits in a telecommunications network. As a result, a user can more easily recognize communication paths between two locations. In addition, a path analysis component receives target circuit information specifying two locations and a rate code and, in response, identifies one or more communication paths that communicate information between the specified locations according to a bandwidth associated with the rate code. In response to a user selecting one of the identified communication paths, a provisioning component automatically assigns available circuits to the selected communication path. Together, the path analysis and provisioning components reduce the time and resources that a telecommunications provider must devote to establishing a communication path between two locations. In addition, a boundary area component limits the analysis of communication paths to locations and circuits associated with a defined boundary area. The boundary area component improves the efficiency of the present invention by limiting the path analysis to the most relevant network data relating to the network. The present invention enables a telecommunications provider to provide faster service to customers at lower cost. For these and other readily apparent reasons, the present invention represents a significant advance over prior art systems and methods.

BRIEF DESCRIPTION OF THE DRAWINGS

To provide a more complete understanding of the present invention, and for further features and advantages thereof, reference is now made to the following description taken in conjunction with the accompanying drawings, in which:

FIGS. 11A, 11B and 11C is a flow chart of an exemplary method of analyzing communication paths in a telecommunications network.

DETAILED DESCRIPTION OF THE DRAWINGS

Figure 1:
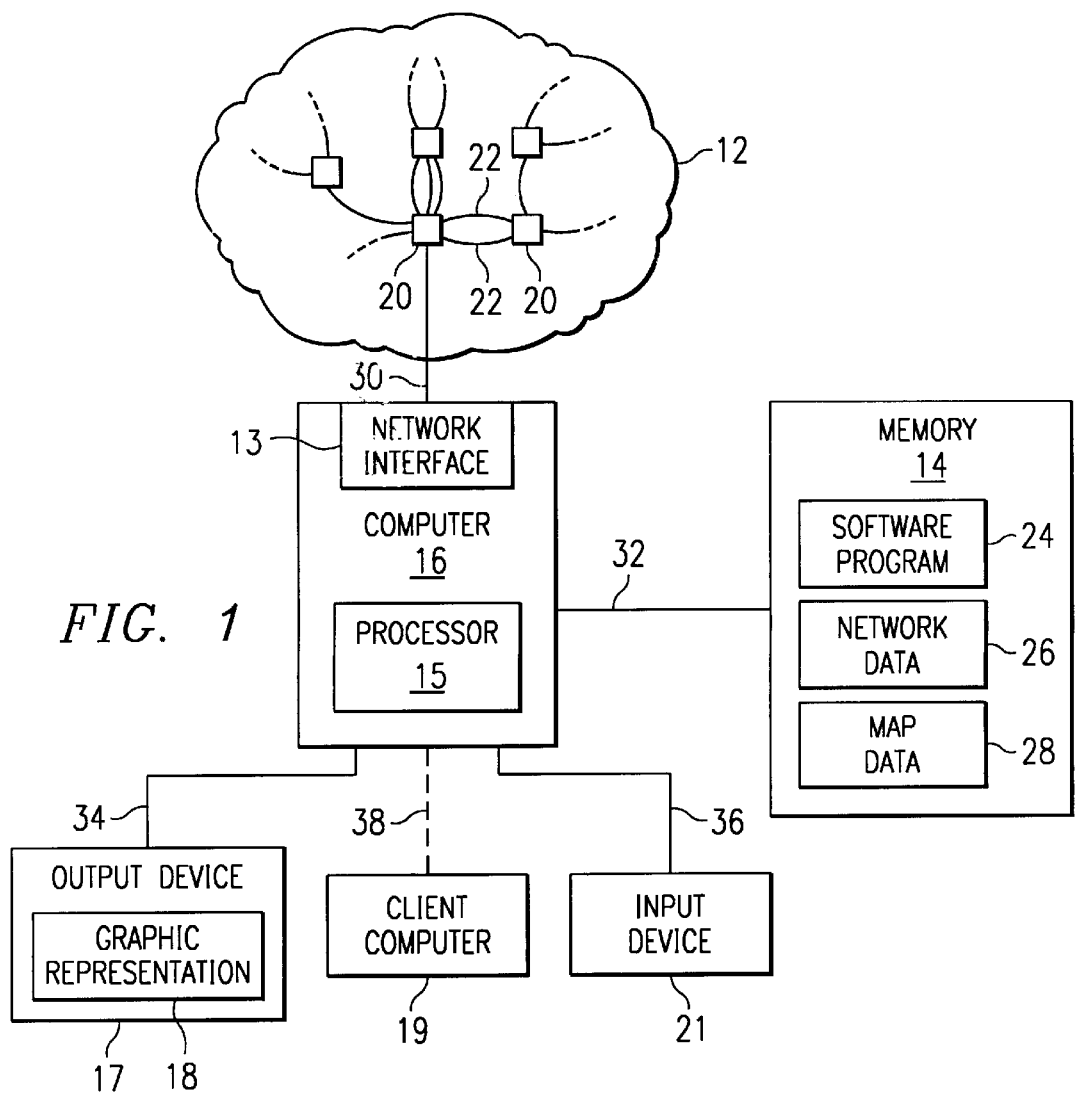
FIG. 1 is a block diagram of a system for analyzing communication paths in a telecommunications network.

FIG. 1 is a block diagram of a system 10 for analyzing communication paths in a telecommunications network 12. Network 12 includes telecommunication locations 20 coupled together by transmission lines, wireless connections, or other suitable communication links that form circuits 22. System 10 includes a memory 14, a computer 16, an input device 21, an output device 17, and a network interface 13. As described in further detail below, system 10 generates a graphic representation 18 of network 12. In addition, system 10 may identify one or more communication paths that communicate information between two specified locations 20.

Network 12 communicates information between locations 20 using circuits 22. Each location 20 represents either telecommunication equipment or a telecommunications site, such as a building or telecommunications closet, that includes telecommunication equipment. In a particular embodiment, locations 20 are central offices, remote terminals, or other equipment locations in network 12. Circuits 22 may be physical links, wireless links, virtual links, or protocols that support communication of information between two locations 20. In a particular embodiment, each circuit 22 communicates information according to a rate code. For example, a rate code may be a classification level in the Digital Signal hierarchy (such as DS-1, DS-1C, DS-2, DS-3, DS-4, etc.), Optical Carrier hierarchy (such as OC-1, OC-3, OC-12, OC-48, OC-192, OC-256, etc.), Synchronous Transport Signal hierarchy (such as STS-1, STS-3, STS:12, STS-48, etc.), Virtual Tributary hierarchy (such as VT1, VT1.5, VT2, VT3, VT6, etc), or any other suitable telecommunications signal hierarchy. System 10 contemplates any form of circuits 22 that communicate information between locations 20 in network 12 and any grant of rate codes that define or specify the capabilities, structure, or arrangement of circuits 22.

Memory 14 stores a program 24, network data 26, and map data 28. Program 24 is an organized list of instructions that, when executed by processor 15, causes computer 16 and output device 17 to behave in a predetermined manner. One specific implementation of program 24 is described in further detail below in conjunction with FIG. 2. Network data 26 includes location information identifying locations 20, circuit information identifying circuits 22, and any other suitable information relating to network 12. In a particular embodiment, network data 26 identifies each location 20 using a common language location identifier (CLLI) and identifies each circuit 22 using a rate code and two CLLI codes assigned to endpoint locations 20 coupled to circuit 22. A CLLI code typically includes either eight or eleven bytes: the first four bytes relate to a municipality, the fifth and sixth bytes are state codes, the seventh and eighth bytes identify a central office or other telecommunications site, and the ninth through eleventh bytes, if included in a CLLI, specify a particular piece of equipment. In addition to location and circuit information, network data 26 may include other suitable information relating to network 12. For example, network data 26 may associate each location 20 with latitude and longitude coordinates, vertical and horizontal coordinates as defined by the Vertical and Horizontal Coordinate System, or any other suitable geographic coordinates for identifying a relative position of each location 20. Map data 28 includes information relating to the location of countries, states, cities, streets, exchange areas, local access and transport areas, interexchange carriers, cellular or satellite coverage areas, or other geographic features or geographic-based telecommunications features. Although memory 14 is illustrated as external to computer 16 in FIG. 1, memory 14 may be external or integral to computer 16 according to particular needs. Memory 14 may include volatile memory, non-volatile memory, or both. In a particular embodiment, at least some of the information in memory 14 is stored in a database.

By executing program 24 using processor 15, computer 16 analyzes communication paths in network 12. As explained in further detail below, computer 16 generates graphic representation 18 of network 12 using network data 26 and map data 28. Computer 16 displays graphic representation 18 using output device 17, which may include a computer monitor, a projector, a printer, or any other suitable device with a display screen or other output capability. In addition, computer 16 identifies one or more communication paths that communicate information between two locations 20. Using input device 21, a user enters target circuit information by specifying two locations 20 and a rate code. Input device 21 may include a keyboard, a mouse, a trackball, a touch screen, or any other suitable user interface. In response to receiving the target circuit information, computer 16 identifies one or more communication paths between specified locations 20. Each communication path is a series of one or more circuits 22 that communicate information according to the specified rate code. Computer 16 may also provision an identified communication path using network interface 13. Computer 16 may be a personal computer, a workstation, a minicomputer, a mainframe, a supercomputer, or any other suitable communications and processing device. In a particular embodiment, computer 16 is a network server, and users interact with computer 16 using one or more client computers 19. Links 30, 32, 34, 36 and 38 couple computer 16 to network 12, memory 14, output device 17, input device 21, and client computer 19, respectively. Links 30, 32, 34, 36 and 38 may be shared or dedicated communication paths that support serial, parallel, or any other suitable form of communication and may be associated with one or more intermediate components.

Network interface 13 communicates provisioning information to assign one or more circuits 22 to a selected communication path. Network interface 13 communicates with switches, gateway devices, or other telecommunications equipment using an overlay Internet Protocol (IP) network, an in-band network, an out-of-band network, or any other suitable network for communicating provisioning information. In a particular embodiment, a network management system monitors a database of objects called a Management Information Base (MIB). Using the network management system, network interface 13 communicates provisioning information that modifies a parameter, setting, assignment variable, or other configuration information in the MIB to assign one or more circuits 22 to a communication path. Computer 16 may execute suitable network management software that generates provisioning commands or may pass another form of provisioning information to a separate network management system for translation, processing, and/or forwarding to the equipment. Using either integral or separate network management software, network interface 13 allows computer 16 to communicate provisioning information to remotely configurable equipment in network 12. In a particular embodiment, computer 16 can assign circuits 22 to the selected communication path autonomously and without further user intervention.

Figure 2:
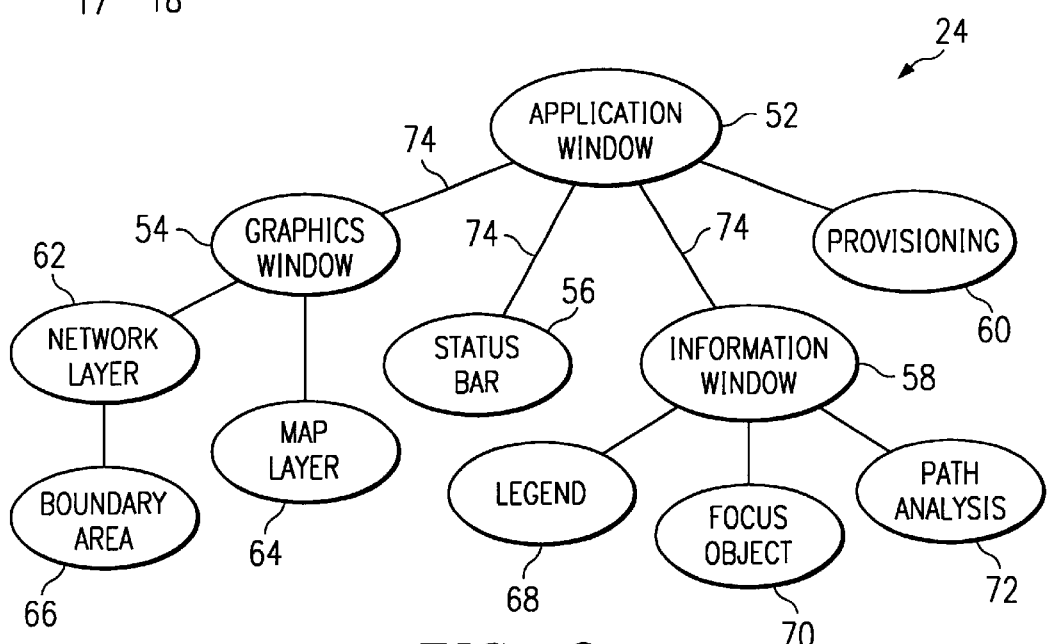
FIG. 2 is a diagram of one embodiment of a program that analyzes communication paths in a telecommunications network.

FIG. 2 is a diagram of program 24 that analyzes communication paths in network 12. Program 24 includes several software components 52–72 that are each responsible for a separate set of well-defined tasks. Typically, software components 52–72 are reasonably self-contained so that a software developer may design, construct, and update each component 52–72 substantially independent of the specific implementation of other components 52–72. Links 74 couple together two components 52–72 that communicate, or otherwise interact, with each other. FIG. 2 illustrates a particular embodiment of program 24. Although a particular software implementation is described in detail, program 24 contemplates any combination of hardware, software, or both hardware and software that implements the described functionality using any configuration of one or more components. Generically, program 24 can be described as a processing component that processes information and a display component that displays information.

Application window component 52 receives target circuit information and boundary information from a user. To analyze communication paths between two locations 20, a user enters target circuit information using input device 21. The target circuit information specifies two locations 20 and a desired rate code. In addition, a user may enter boundary information to limit the analysis of communication paths to a portion of network 12. The boundary information may include one or more distances, geographic coordinates, an identifier associated with a geographic area, or any other suitable information for identifying a portion of network 12. In a particular embodiment, application window component 52 generates an input dialog box to receive the target circuit information and boundary information. Using the input dialog box, a user enters two CLLI codes assigned to two locations 20, search radii defining search areas around locations 20, and a rate code specifying a classification level according to the Digital Signal hierarchy, Optical Carrier hierarchy, Synchronous Transport hierarchy, Virtual Tributary hierarchy, or any other suitable telecommunications signal hierarchy.. In response to receiving target circuit information and boundary information, application window component 52 uses graphics window component 54, status bar component 56, information window component 58, and provisioning component 60 to analyze communication paths in network 12.

Graphics window component 54 receives target circuit information and boundary information from application window component 52 and, in response, generates graphic representation 18 of network 12 using network layer component 62, and map layer component 64.

Boundary area component 66 receives boundary information from network layer component 62 and, in response, defines a boundary area in network 12. Boundary area component 66 defines a boundary area that includes locations 20 specified in the target circuit information. In a particular embodiment, boundary area component 66 identifies search areas around specified locations 20 and defines a boundary area enclosing the search areas. For example, boundary area component 66 may identify a circular search area around each location 20 according to a search radius specified by the boundary information and then define a rectangular boundary area enclosing the search areas. Boundary area component 66 also allows a user to modify a defined boundary area. In a particular embodiment, boundary area component 66 generates a boundary modification window that includes a pair of arrows or other adjustment indicators for each side of a defined boundary area. Using the adjustment indicators, a user may modify the sides of the boundary area by a selected increment distance. By limiting the analysis of communication paths to a defined boundary area, boundary area component 66 reduces the number of locations 20 and circuits 22 that network layer component 62 represents in graphic representation 18 and reduces the number of circuits 22 that path analysis component 72 examines to identify communication paths. As a result, boundary area component 66 improves the efficiency of program 24 by restricting network layer component 62 and path analysis component 72 to the most relevant information in network data 26.

Network layer component 62 generates a configuration of nodes and connectors representing locations 20 and circuits 22 in network 12. Using network data 26, network layer component 62 identifies locations 20 and circuits 22 associated with the boundary area defined by boundary area component 66. In a particular embodiment, network layer component 62 identifies locations 20 and circuits 22 positioned within the boundary area according to geographic coordinates stored in memory 14. In another embodiment, if at least one synchronous optical network (SONET) circuit 22 is positioned within the boundary area, network layer component 62 also identifies locations 20 and circuits 22 included in the SONET ring. After identifying locations 20 and circuits 22 associated with the boundary area, network layer component 62 generates a configuration of nodes and connectors to represent identified locations 20 and circuits 22. The nodes represent one or more locations 20, and the connectors represent one or more circuits 22 communicating information between locations 20. In a particular embodiment, one node may represent several locations 20, and one connector may represent several circuits 22.

Network layer component 62 generates nodes and connectors with display characteristics that indicate attributes of locations 20 and circuits 22. The display characteristics may include colors, styles, shapes, patterns, or any other suitable features or traits that visually distinguish the nodes and connectors from one another. In a particular embodiment, network layer component 62 generates different color connectors according to the rate codes of circuits 22. In another embodiment, network layer component 62 generates connectors using different styles of lines according to the ownership status of circuits 22. For example, solid-line connectors may represent wholly-owned circuits 22, dashed-line connectors may represent jointly-owned circuits 22, and dotted-line connectors may represent leased circuits 22. Similarly, network layer component 62 generates nodes with display characteristics that indicate attributes of locations 20. In a particular embodiment, network layer component 62 generates different shapes of nodes to represent locations 20 specified by the target circuit information. Network layer component 62 may change a display characteristic of the nodes and connector in response to user input. In a particular embodiment, network layer component 62 changes the color of a node or connector in response to a user selecting the node or connector.

Map layer component 64 provides a geographic background for the configuration of nodes and connectors generated by network layer component 62. To construct the geographic background, map layer component 64 uses map data 28, which includes information relating to the location of countries, states, cities, streets, exchange areas, local access and transport areas, interexchange carriers, cellular or satellite coverage areas, or other geographic features or geographic-based telecommunications features. In a particular embodiment, a user selects a geographic background, and in response, map layer component 64 processes map data 28 to generate the selected background. Graphics window component 54 positions the nodes and connectors generated by network layer component 62 against the geographic background according to the coordinates of locations 20 represented by the nodes. Map layer component 64 enhances the presentation of graphic representation 18 by providing a geographic context within which a user may view the configuration of nodes and connectors representing network 12.

Status bar component 56 generates information relating to a user's interaction with graphic representation 18 and displays the information is a status bar window. Status bar component 56 generates text information identifying the boundary area defined by boundary area component 66 and displays the text information in the status bar window. In a particular embodiment, status bar component 56 generates and displays the dimensions of a rectangular boundary area. Status bar component 56 also calculates and displays the coordinates of a user-controlled pointing device, such as an arrow manipulated using a mouse. In response to a user selecting a node in graphic representation 18, status bar component 56 displays, in the status bar window, text information identifying location 20 represented by the selected node. In a particular embodiment, the text information is a CLLI code assigned to location 20. Similarly, in response to a user selecting a connector in graphic representation 18, status bar component 56 displays, in the status bar window, text information identifying one or more circuits 22 represented by the selected connector. In a particular embodiment, the text information for each circuit 22 includes two location identifiers assigned to locations 20 coupled to circuit 22 and a rate code assigned to circuit 22. For example, the location identifiers may be CLLI codes assigned to locations 20, and the rate code may specify a classification level in the Digital Signal hierarchy, Optical Carrier hierarchy, Synchronous Transport Signal hierarchy, Virtual Tributary hierarchy, or any other suitable telecommunications signal hierarchy.

Information window component 58 generates text information relating to graphic representation 18 and displays the text information in one or more information windows. In a particular embodiment, information window component 58 generates three drop-down windows—a legend window, a focus object information window, and a path analysis window. In response to a user selecting one of the three windows, information window component 58 uses legend component 68, focus object component 70, or path analysis component 72 to generate and display text information in the selected window.

Legend component 68 generates and displays a legend window that indicates the meaning of the display characteristics of the nodes and connectors in graphic representation 18. As described above, network layer component 62 generates nodes and connectors with different display characteristics. Legend component 68 generates a legend window that includes an explanatory list relating the display characteristics to one or more attributes of locations 20 and circuits 22. For example, in a particular embodiment, the legend window may list several classification levels associated with the Digital Signal hierarchy, Optical Carrier hierarchy, Synchronous Transport Signal hierarchy, Virtual Tributary hierarchy, or any other suitable telecommunications signal hierarchy, and then associate each of the listed classification levels with a color of connector used by network layer component 62 to represent circuits 22 of the associated classification level.

Focus object component 70 generates and displays a focus object information window with text information relating to a selected connector or node from graphic representation 18. Using input device 21, a user selects a connector or node in graphic representation 18. In a particular embodiment, a user manipulates a pointer displayed on output device 18 to select the connector or node in graphic representation 18. In response to the user selecting a connector, focus object component 70 generates and displays text information identifying one or more circuits 22 represented by the connector. In a particular embodiment, the text information for each circuit 22 includes the CLLI codes of locations 20 coupled to circuit 22 and a rate code specifying a classification level in the Digital Signal hierarchy, Optical Carrier hierarchy, Synchronous Transport Signal hierarchy, Virtual Tributary hierarchy, or any other suitable telecommunications signal hierarchy. In a particular embodiment, if a selected connector represents more than one circuit 22, a user may specify one of circuits 22 represented by the connector, and in response, focus object component 70 generates and displays text information identifying specified circuit 22. In response to the user selecting a node, focus object component 70 generates and displays text information identifying one or more locations 22 represented by the node. In a particular embodiment, the text information for each location 20 includes a CLLI code assigned to location 20, equipment information identifying equipment associated with location 20, and geographic coordinates specifying the position of location 20. In a particular embodiment, if a selected node represents more than one location 20, a user may specify one of locations 20 represented by the node, and in response focus object component 70 generates and displays text information identifying specified location 20. For example, if a user selects a node that represents a building including numerous telecommunication closets, the user may specify one of the telecommunications closets, and in response, focus object component 70 may generate and display text information relating to the specified closet. Similarly, in response to a user selecting a piece of equipment housed in the closet, focus object component 70 may generate and display configuration information relating to the equipment.

Path analysis component 72 receives target circuit information specifying two locations 20 and a rate code and, in response, identifies one or more communication paths that communicate information between specified locations 20 according to the rate code. A communication path may include one circuit 22 coupled between specified locations 20 or a series of circuits 22 coupled between specified locations 20. In a particular embodiment, path analysis component 72 generates the communication paths using circuits 22 that network layer component 62 identifies as associated with the boundary area defined by boundary-area component 66. Path analysis component 72 generates communication paths according to various levels of precision. For example, according to one precision level, a series of circuits 22 qualify as a communication path if adjacent circuits 22 within the series have matching equipment identifiers indicating that adjacent circuits 22 couple to common equipment. In a particular embodiment, the matching equipment identifiers are 11-byte CLLI codes, and path analysis component 72 identifies a series of circuits as a communication path if adjacent circuits 22 share a common 11-byte CLLI code. According to another precision level, a series of circuits 22 qualify as a communication path if adjacent circuits 22 within the series have matching location identifiers indicating that adjacent circuits 22 couple to the same telecommunications site. Thus, for example, two circuits 22 coupled to the same central office or telecommunications closet qualify as a communication path even if circuits 22 do not couple to common equipment. In a particular embodiment, the matching location identifiers are 8-byte CLLI codes, and path analysis component 72 identifies a series of circuit as a communication path if adjacent circuits 22 share a common 8-byte CLLI code. In a particular embodiment, path analysis component 72 may identify communication paths that include adjacent circuits coupled to remotely configurable equipment. As a result, network interface 13 may automatically provision the identified communications paths by communicating provisioning information to assign circuits 22 to the communication paths.

After identifying one or more communication paths between two locations 20, path analysis component 72 generates and displays a path analysis window listing the identified communication paths. Path analysis component 72 may sort or filter the list of communication paths according to various criteria. In a particular embodiment, in response to a user selecting a sort criteria, path analysis component 72 sorts the list of communication paths according to costs, number of leased circuits 22, number of wholly-owned circuits 22, or any other suitable criteria. In an alternative embodiment, path analysis component 72 automatically sorts the list of communication paths in ascending order according to the number of circuits 22 in each communication path. In response to a user selecting a filter criteria, path analysis component 72 filters the list of communication paths according to the selected filter criteria. In a particular embodiment, a user may specify one of locations 20, and path analysis component 72 filters the list of communication paths to identify and display communication paths that include specified location 20. In another embodiment, a user may specify two of locations 20, and path analysis component 72 filters the list of communication paths to identify and display communication paths that include circuit 22 coupled between two specified locations 20. In response to a user selecting one of the communication paths from the list, path analysis component 72 displays, in the path analysis window, each intermediate location 20 in the selected communication path. In addition, graphics window component 54 alters a display character of the connectors and/or nodes representing circuits 22 and locations 20 in the selected communication path. As a result, a user may easily identify a selected communication path using either the text information in the path analysis window or graphic representation 18.

Provisioning component 60 provisions a communication path by assigning one or more circuits 22 to the communication path. In a particular embodiment, provisioning component 60 may provision a communication path in response to a user selecting one of circuits 22 in the communication path. Provisioning component 60 generates a circuit assignment window listing one or more circuits 22 represented by a connector in the communication path. The list indicates whether each circuit 22 is already in service, reserved for future service, or available for assignment. In response to a user selecting unassigned circuit 22 from the list, provisioning component 60 assigns selected circuit 22 to the communication path. In another embodiment, provisioning component 60 provisions a communication path by automatically selecting available circuits 22 in the communication path. Rather than rely on a user to select available circuits 22, provisioning component 60 identifies available circuits 22 for each connector in the communication path and assigns identified circuits 22 to the communication path.

Provisioning component 60 communicates provisioning information to assign circuits 22 to the communication path. In a particular embodiment, provisioning component 60 generates a work order, an equipment order, or other provisioning information so that a telecommunications providers may properly configure circuits 22. In another embodiment, if one or more circuits 22 are coupled to remotely configurable equipment, provisioning component 60 may communicate provisioning information to the remotely configurable equipment. Using network interface 13, provisioning component 60 modifies a parameter, setting, assignment variable, or other configuration information associated with circuit 22. In a particular embodiment, path analysis component 72 identifies communication paths with adjacent circuits 22 coupled to remotely configurable equipment, so that a user may fully exploit the ability of provisioning component 60 to assign circuits 22 to a communication path. Provisioning component 60 reduces the time and resources that telecommunications providers must devote to establishing a communication path between two locations 20. As a result, telecommunications providers can provide faster service to customers at a lower cost.

Figure 3:
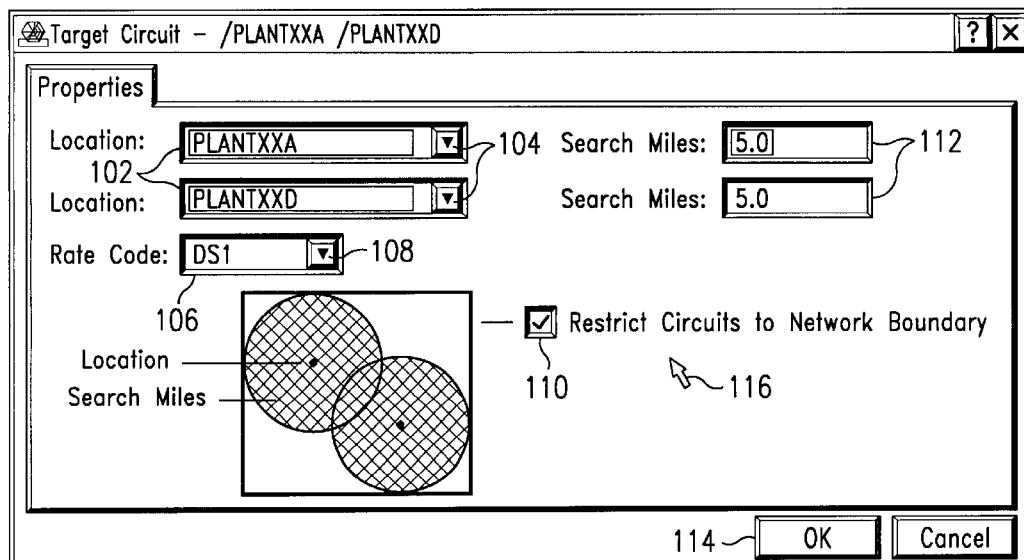
FIG. 3 illustrates an input dialog box that receives target circuit information and boundary information from a user.

FIG. 3 illustrates an input dialog box 100 that receives target circuit information and boundary information from a user. As described above, application window component 52 generates and displays dialog box 100 using output device 17. A user enters target circuit information by specifying two locations 20 and a rate code. In the illustrated embodiment, a user specifies each location 20 by either entering a location identifier in an entry box 102 or by selecting a location identifier using a pull-down selector 104. Similarly, a user specifies a rate code by either entering a rate code in an entry box 106 or by selecting a rate using a pull-down selector 108 By checking a box 110, a user may restrict the analysis of communication paths to locations 20 and circuits 22 associated with a boundary area. In a particular embodiment, dialog box 100 provides, for each location 20, a default search radius, which the user may modify by entering a search radius in an entry box 112. After entering target circuit information and boundary information, a user clicks on an "OK" button 114 with a pointer 116, and dialog box 100 disappears from output device 17.

Figure 4:
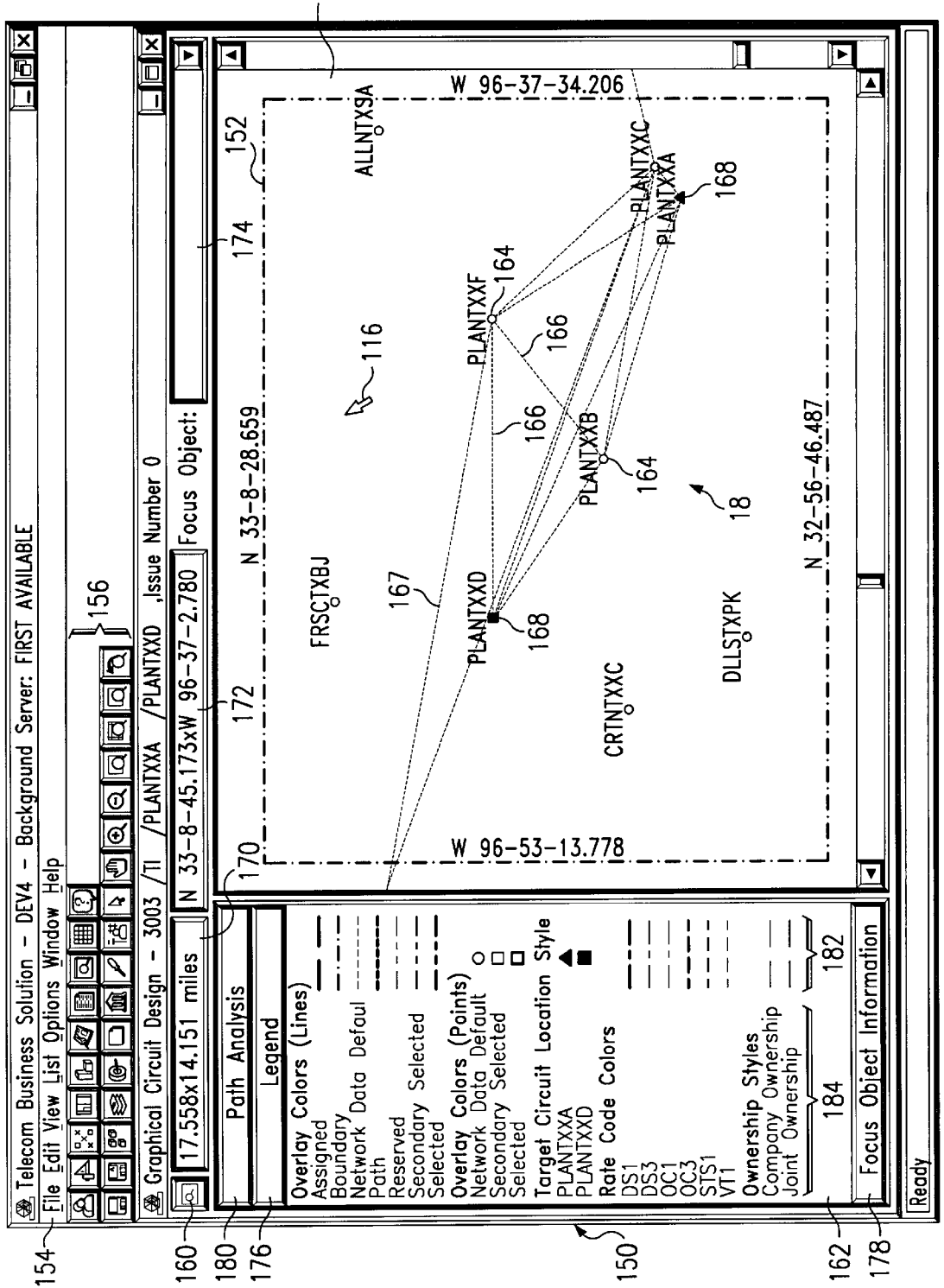
FIG. 4 illustrates an exemplary graphic representation of telecommunication locations and circuits within a boundary area.

FIG. 4 illustrates graphic representation 18 of locations 20 and circuits 22 within boundary area 152. Application window 150 includes pull-down menus 154, a toolbar 156, a graphics window 158, a status bar 160, and an information window 162. Pull-down menus 154 and toolbars 156 present various commands and options that a user may select to manipulate graphics window 158, status bar window 160, and information window 162. Graphics window 158 presents graphic representation 18 of locations 20 and circuits 22 within boundary area 152. Graphic representation 18 includes nodes 164 representing locations 20 and connectors 166 representing circuits 22. In the illustrated embodiment, although circuit 22 represented by connector 167 extends outside boundary area 152, circuit 22 is associated with boundary area 152 because circuit 22 is a part of a SONET ring that includes at least one other circuit 22 positioned within boundary area 152. Status bar 160 includes an output box 170 presenting the dimensions of boundary area 152, an output box 172 identifying a coordinate position of pointer 116, and an output box 174 for identifying one of locations 20 or circuits 22. As described above, information window 162 may include a legend window 176, a focus object window 178, or a path analysis window 180. In FIG. 4, information window 162 displays information from legend window 176. As described above, legend window 176 relates display characteristics 182 of nodes 164 and connectors 166 to attributes 184 of locations 20 and circuits 22. For example, legend window 176 indicates that nodes 168 represent locations 20 specified in the target circuit information.

Figure 5:
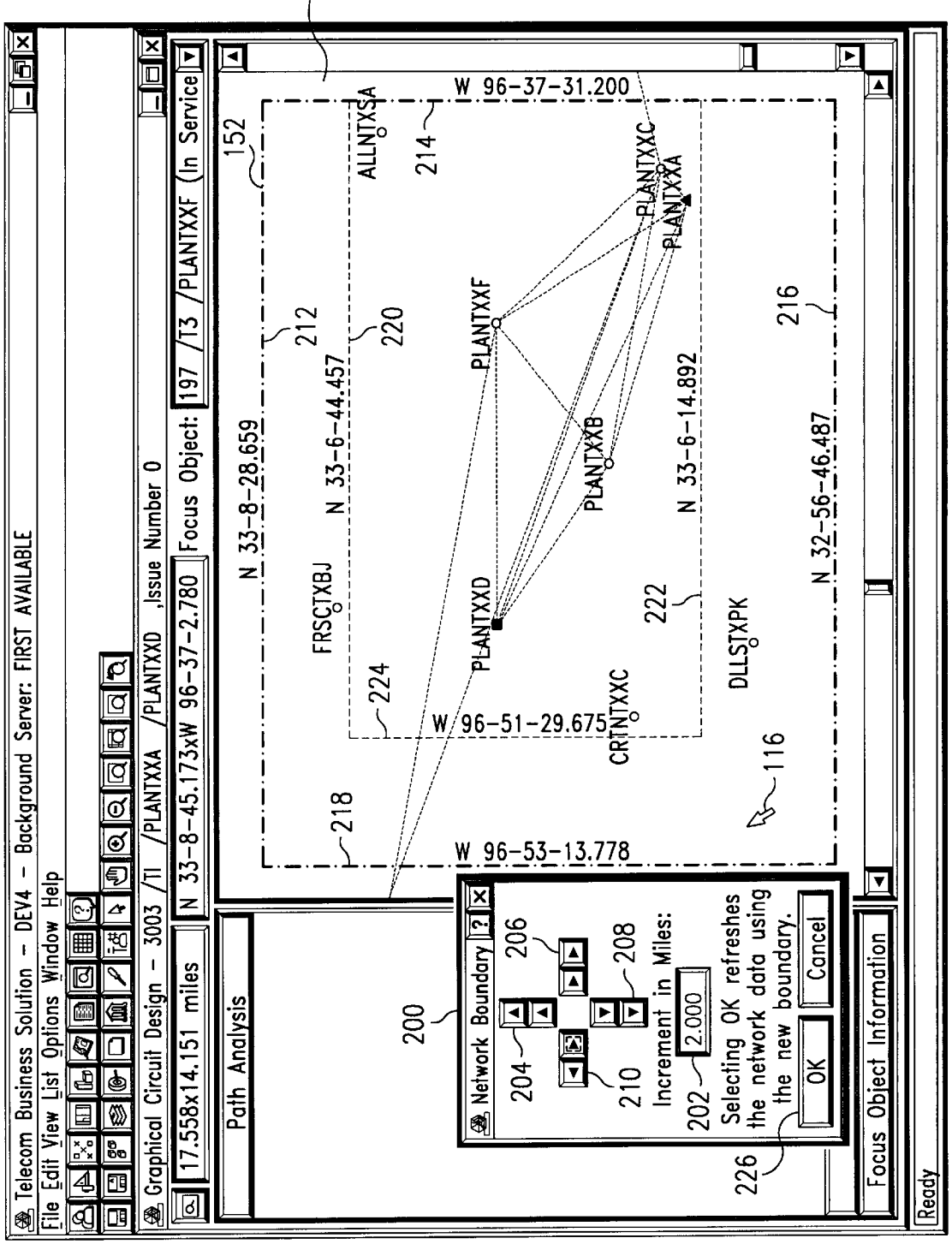
FIG. 5 illustrates a boundary modification window for changing the dimensions of a boundary area.

FIG. 5 illustrates a boundary modification window 200 for changing the dimensions of boundary area 152. Boundary modification window 200 includes an entry box 202 and four sets of input arrows 204, 206, 208 and 210. Using entry box 202, a user may specify an increment distance. In the illustrated embodiment, entry box 202 provides a default increment distance of two miles. Using input arrows 204, 206, 208 and 210, a user may modify sides 212, 214, 216 and 218, respectively, of boundary area 152. In the illustrated embodiment, a user has modified top side 212, bottom side 216, and left side 218 as indicated by dotted lines 220, 222 and 224, respectively. In response to the user entering the modifications by clicking on an "OK" button 226 with pointer 116, boundary area component 66 defines new boundary area 152, and network layer component 62 generates a new configuration of nodes 164 and connectors 166 to represent locations 20 and circuits 22 associated with new boundary area 152. Because boundary area component 66 and network layer component 62 do not begin processing until the user clicks "OK" button 226, a user may adjust boundary area 152 without delays due to processing. In an alternative embodiment, a user may modify boundary area 152 using drag-and-drop indicators on each side 212, 214, 216 and 218 of boundary area 152.

Figure 6:
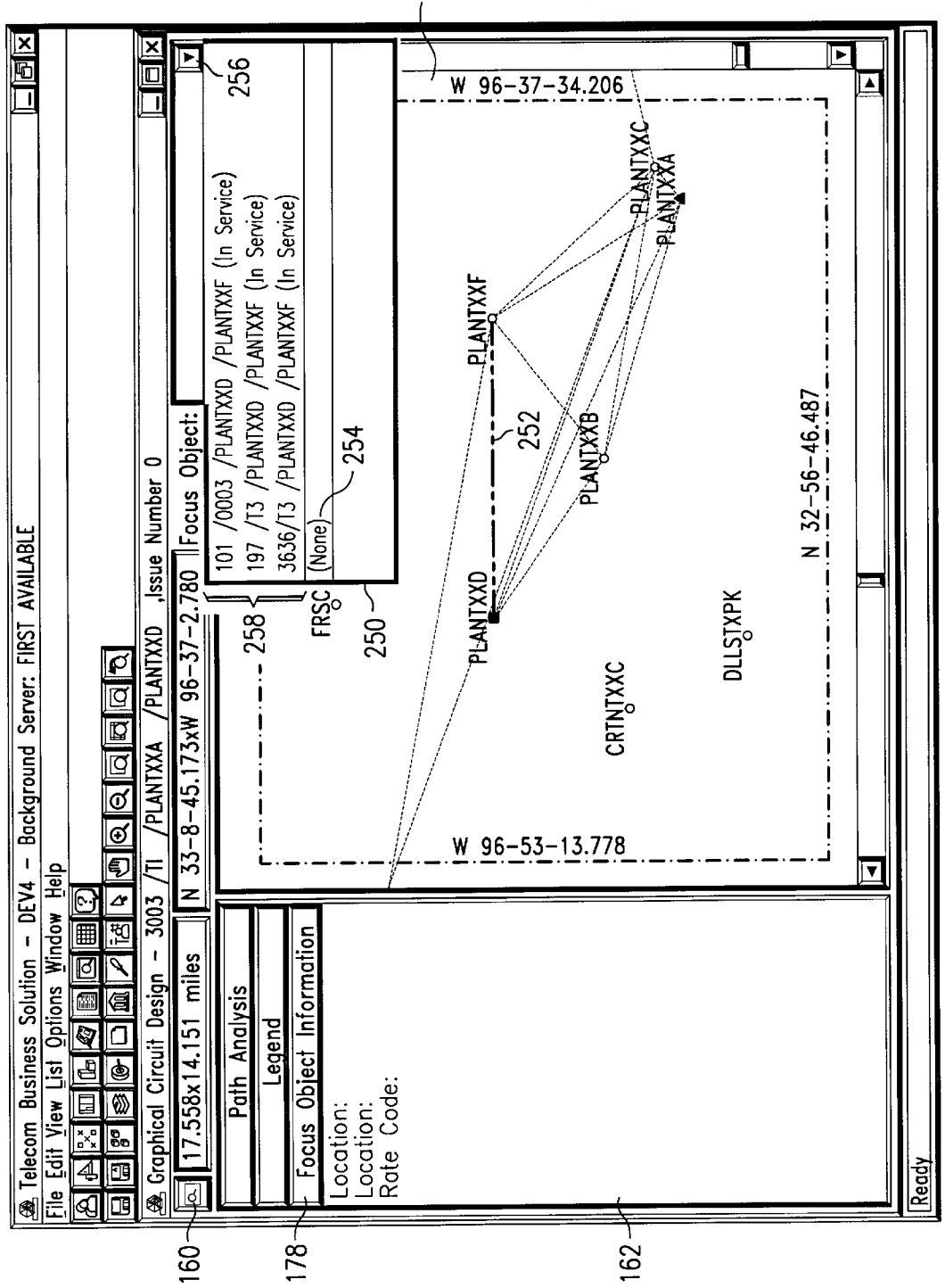
FIG. 6 illustrates a status bar window for selecting a circuit represented by a connector in a graphics window.

FIG. 6 illustrates a status bar window 160 for selecting one of circuits 22 represented by a connector 252 in graphics widow 158. In the illustrated embodiment, a user has selected connector 252 in graphics window 158 and clicked on pull-down selector 256. As a result, a pull-down window 250 displays circuit identifiers 258 associated with selected connector 252. Circuit identifiers 258 identify circuits 22 represented by selected connector 252 in graphics window 158. A bar 254 indicates that the user has selected none of circuit identifiers 258, and thus, focus object information window 178 does not display any circuit information. Using bar 254, the user may select one of circuit identifiers 258, and in response, focus object information window 178 displays circuit information relating to circuit 22 assigned to selected circuit identifier 258.

Figure 7:
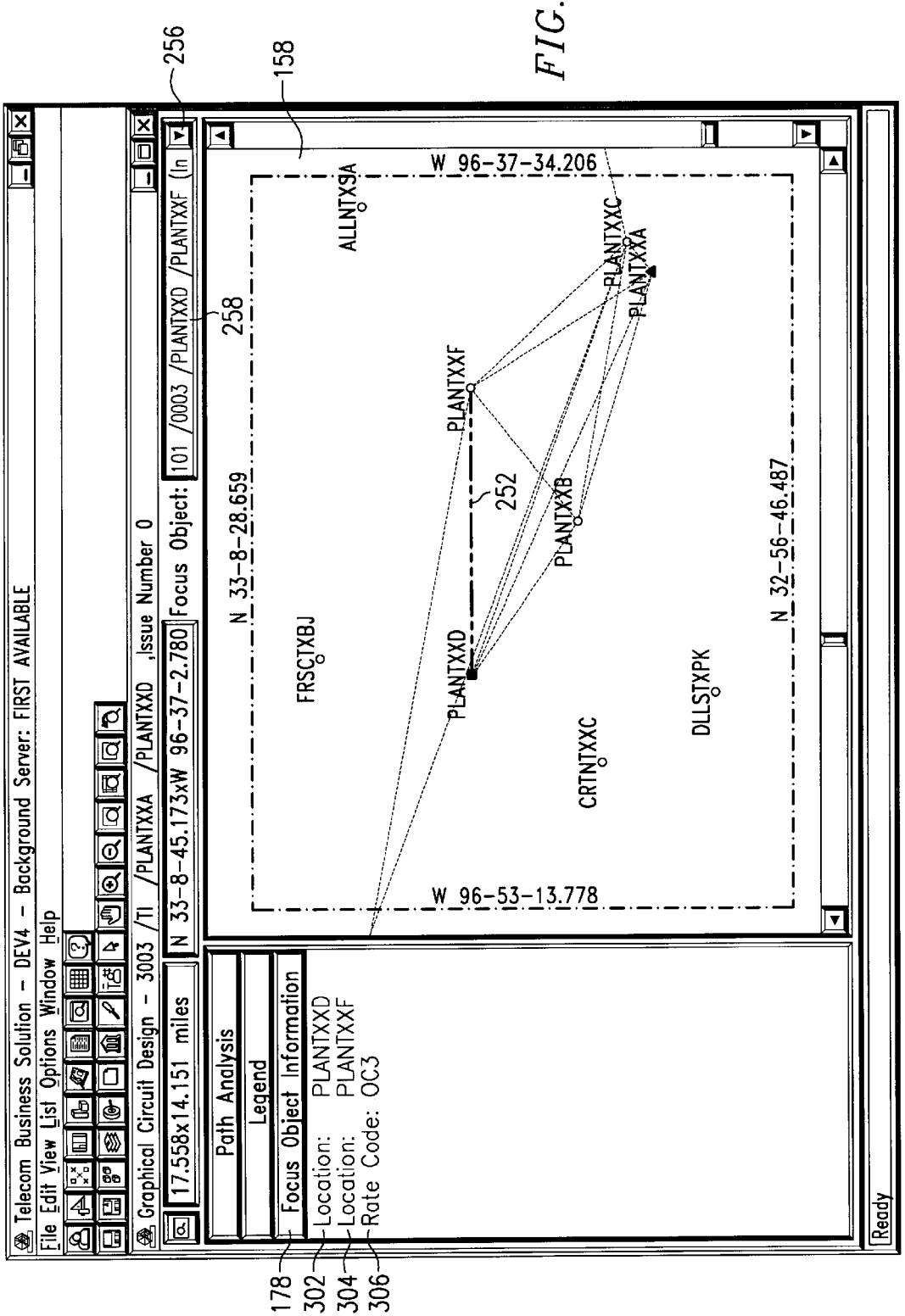
FIG. 7 illustrates a focus object information window for providing text information relating to a selected circuit.

FIG. 7 illustrates focus object information window 178 for providing text information relating to selected circuit 22. In the illustrated embodiment, a user has selected circuit identifier 258 using pull-down selector 256. Circuit identifier 258 identifies one of circuits 22 represented by connector 252 in graphics window 158. Focus object information window 178 displays circuit information relating to circuit 22. The circuit information includes two CLLI codes 302 and 304 identifying endpoint locations 20 of circuit 22 and a rate code 306 specifying a classification level in the Optical Carrier hierarchy.

Figure 8:
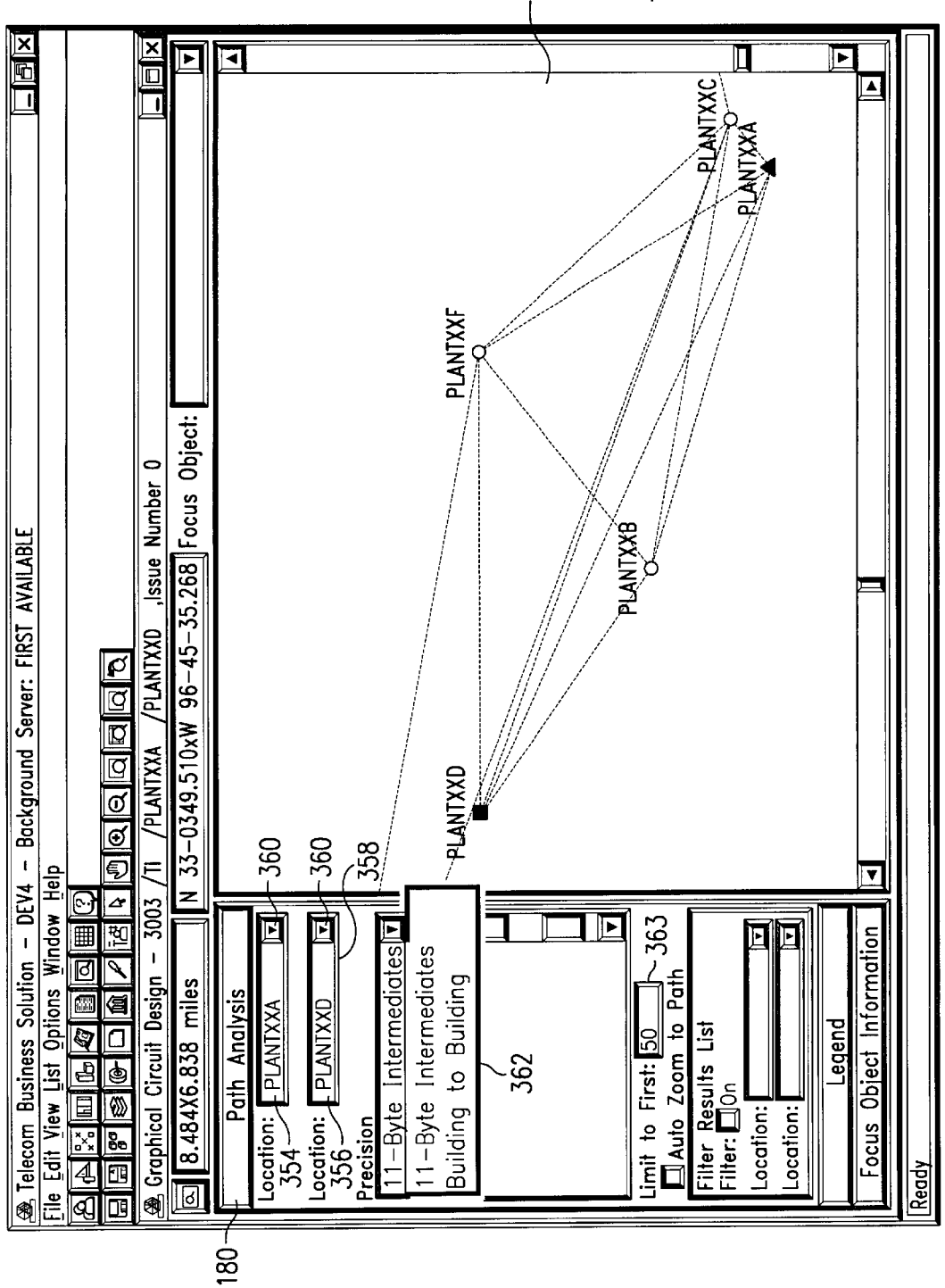
FIG. 8 illustrates a path analysis window for selecting a precision level for communication path analysis.

FIG. 8 illustrates path analysis window 180 for selecting a precision level for the communication path analysis. In the illustrated embodiment, path analysis window 180 displays two eight-byte CLLI codes 354 and 356 identifying locations 20 specified in the target circuit information. As described above, a user may enter CLLI codes 354 and 356 using input dialog box 100. Alternatively, a user may specify each location 20 by either entering a location identifier in an entry box 358 or by selecting a location identifier using a pull-down selector 360. Using a precision pull-down selector 362, a user enters a precision level for analyzing communication paths between two specified locations 20. In the illustrated embodiment, precision pulldown selector 362 provides two levels of precision: "11-Byte Intermediaries" or "Building to Building." If a user selects 11-byte intermediaries, then adjacent circuits 22 within a communication path must have matching 11-byte CLLI codes, indicating that adjacent circuits 22 couple to common equipment. If a user selects building-to-building, adjacent circuits 22 within a communication path must have matching 8-byte CLLI codes, indicating that adjacent circuits 22 couple to the same telecommunications site. As described above, in alternative embodiments, path analysis component 72 may identify communication paths according to other suitable precision levels. Using entry box 363, a user may instruct path analysis component 72 to display only a specified number of communication paths. In the illustrated embodiment, entry box 363 includes a default number, indicating that path analysis component 72 will display fifty communication paths.

Figure 9:
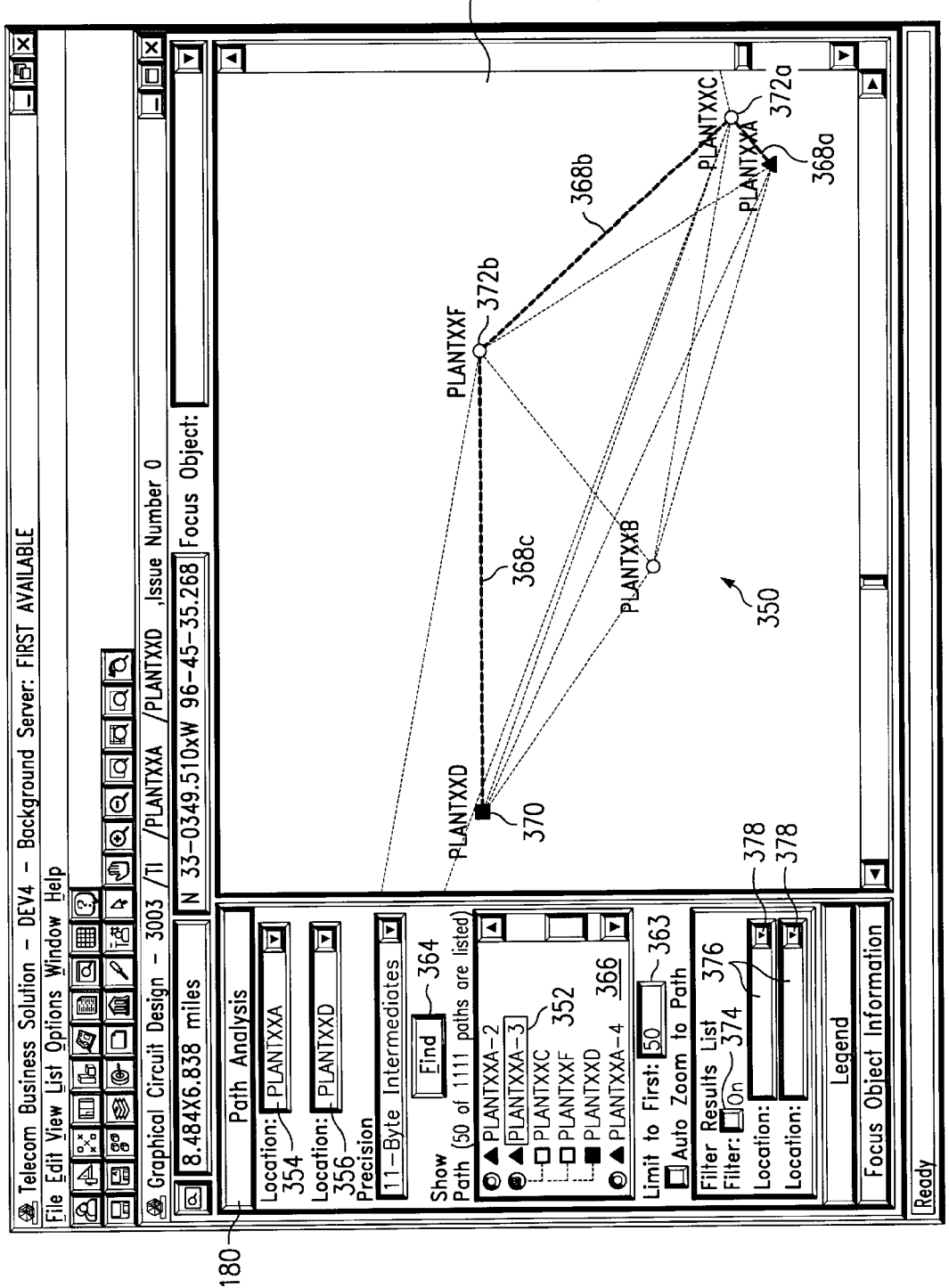
FIG. 9 illustrates a path output box listing communication paths between two specified telecommunication locations and an exemplary graphic representation of a communication path selected from the path output box.

FIG. 9 illustrates a path output box 366 listing communication paths between two selected locations 22 and a graphic representation 350 of a communication path 352 selected from path output box 366. In the illustrated embodiment, the user has selected "11-Byte Intermediaries" using precision pull-down selector 362. As a result, adjacent circuits 22 within a communication path must have matching 11-byte CLLI codes, indicating that adjacent circuits 22 couple to common equipment. In response to the user clicking a "Find" button 364, path analysis component 72 identifies one or more communication paths between locations 20 assigned to CLLI codes 354 and 356. In path output box 366, path analysis component 72 displays the identified communication paths sorted in ascending order according to the number of circuits 22 (displayed after CLLIs) in each communication path. In the illustrated embodiment, the user selected communication path 352 in path output box 366. In response, path output box 366 lists identifiers assigned to intermediary locations 20 in selected communication path 352, and graphics window 158 displays dotted lines 368a, 368b and 368c representing circuits 22 in selected communication path 352. Node 369 represents location 20 assigned to CLLI code 354, and node 370 represents location 20 assigned to CLLI code 356. Nodes 372a and 372b represent intermediary locations 20 along communication path 352. Because the user selected "11-Byte Intermediaries" using precision pull-down selector 362, adjacent circuits 22 represented by dotted lines 368a and 368b couple to common equipment at location 20 represented by node 372a, and adjacent circuits 22 represented by dotted lines 368b and 368c couple to common equipment at location 20 represented by node 372b. If circuits 22 couple to remotely configurable equipment, provisioning component 60 may provision circuits 22 by communicating provisioning information to the remotely configurable equipment.

In a particular embodiment, a user may filter the list of communication paths in path output box 366. A user checks an entry box 374 and specifies one of intermediate locations 20 by either entering a location identifier in an entry box 376 or by selecting a location identifier using a pull-down selector 378. In response, path analysis component 72 displays, in path output box 366, communication paths including specified intermediate location 20. Alternatively, if a user already owns or leases one of circuits 22, the user may filter the list of communication paths to identify communication paths that include circuit 22. The user specifies circuit 22 by entering or selecting two location identifiers assigned to endpoint locations 20 of circuit 22. In response, path analysis component 72 displays, in path output box 366, communication paths that include specified circuit 22.

Figure 10:
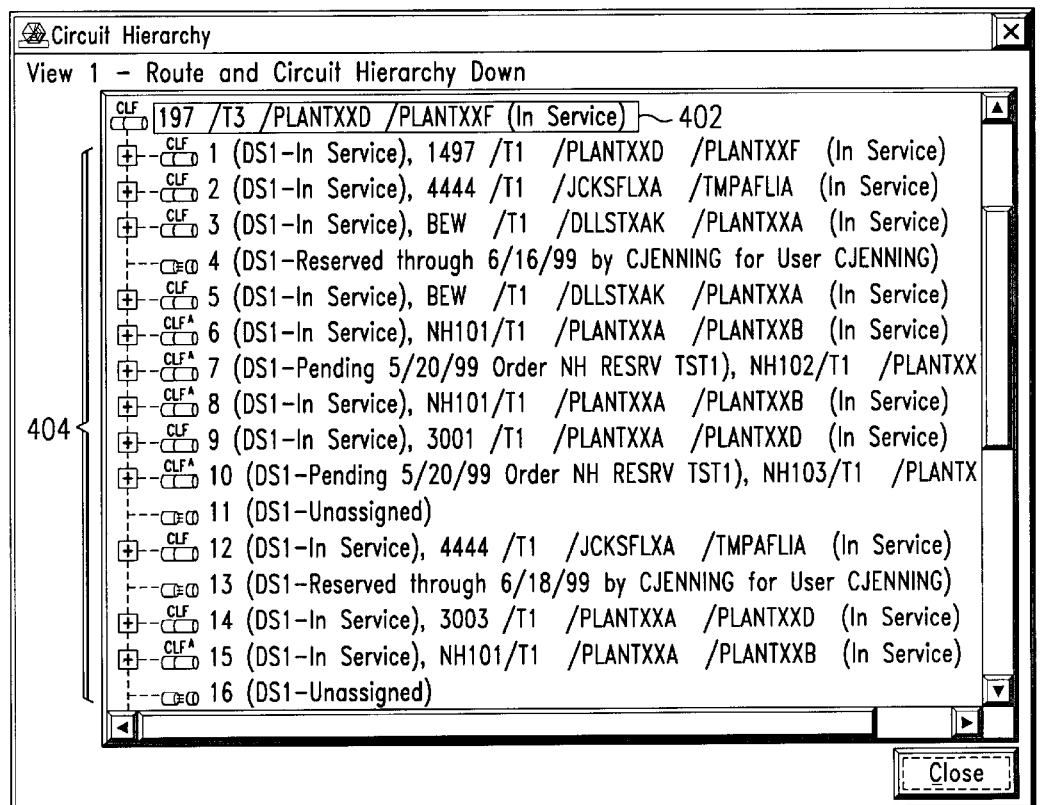
FIG. 10 illustrates a circuit assignment window for assigning one or more circuits to a communication path; and FIG.

FIG. 10 illustrates a circuit assignment window 400 for assigning one or more circuits 22 to selected communication path 352. In response to a user selecting connector 368c from communication path 352, provisioning component 60 generates circuit assignment window 400, listing one or more circuits 22 represented by connector 368c. Circuits 22 listed in assignment window 400 satisfy the rate code specified by the target circuit information. In the illustrated embodiment, circuit assignment window 400 displays circuit information relating to a T3 line 402 that communicates information between two locations 20 assigned CLLI codes "PLANTXXD" and "PLANTXXF." The T3 designation, which is the North American standard for Digital Signal Level 3 (DS-3), indicates that line 402 communicates information at a rate of 44.736 million bits per second (Mbps). As indicated in circuit assignment window 400, a telecommunications provider has channelized T3 line 402 into several DS1 circuits 404. Circuit assignment window 400 specifies whether each DS1 circuit 404 is already in service, reserved for future service, or available for assignment. For each DS1 circuit 404 already in service, circuit assignment window 400 identifies a communication path that circuit 404 is servicing. In response to a user selecting one of unassigned circuits 404, provisioning component 60 communicates provisioning information to assign selected circuit 404 to communication path 352. As described above, provisioning component 60 may communicate provisioning information to remotely configurable equipment to assign selected circuit 404 to communication path 352.

Figure 11A:
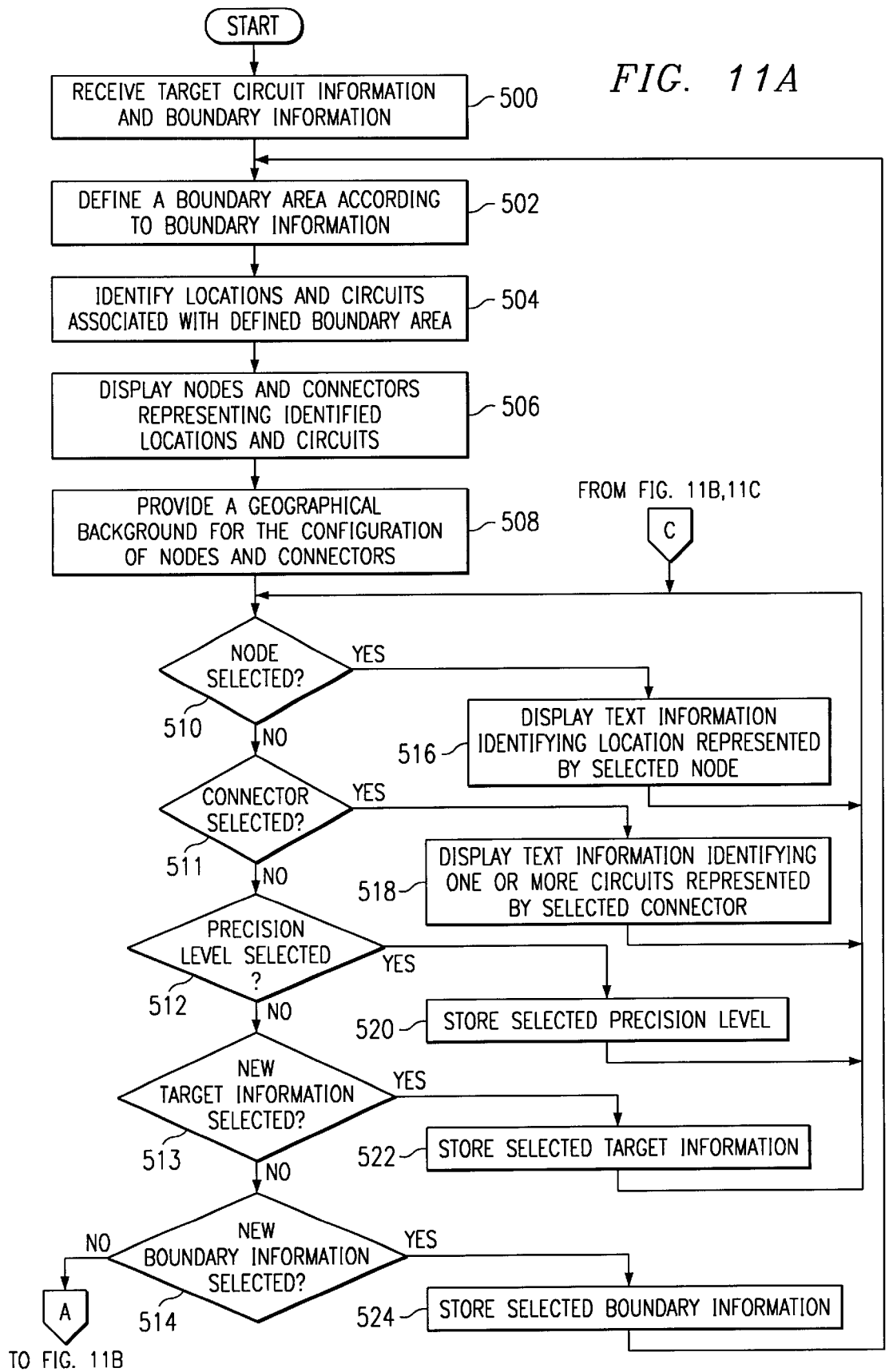
Figure 11C:
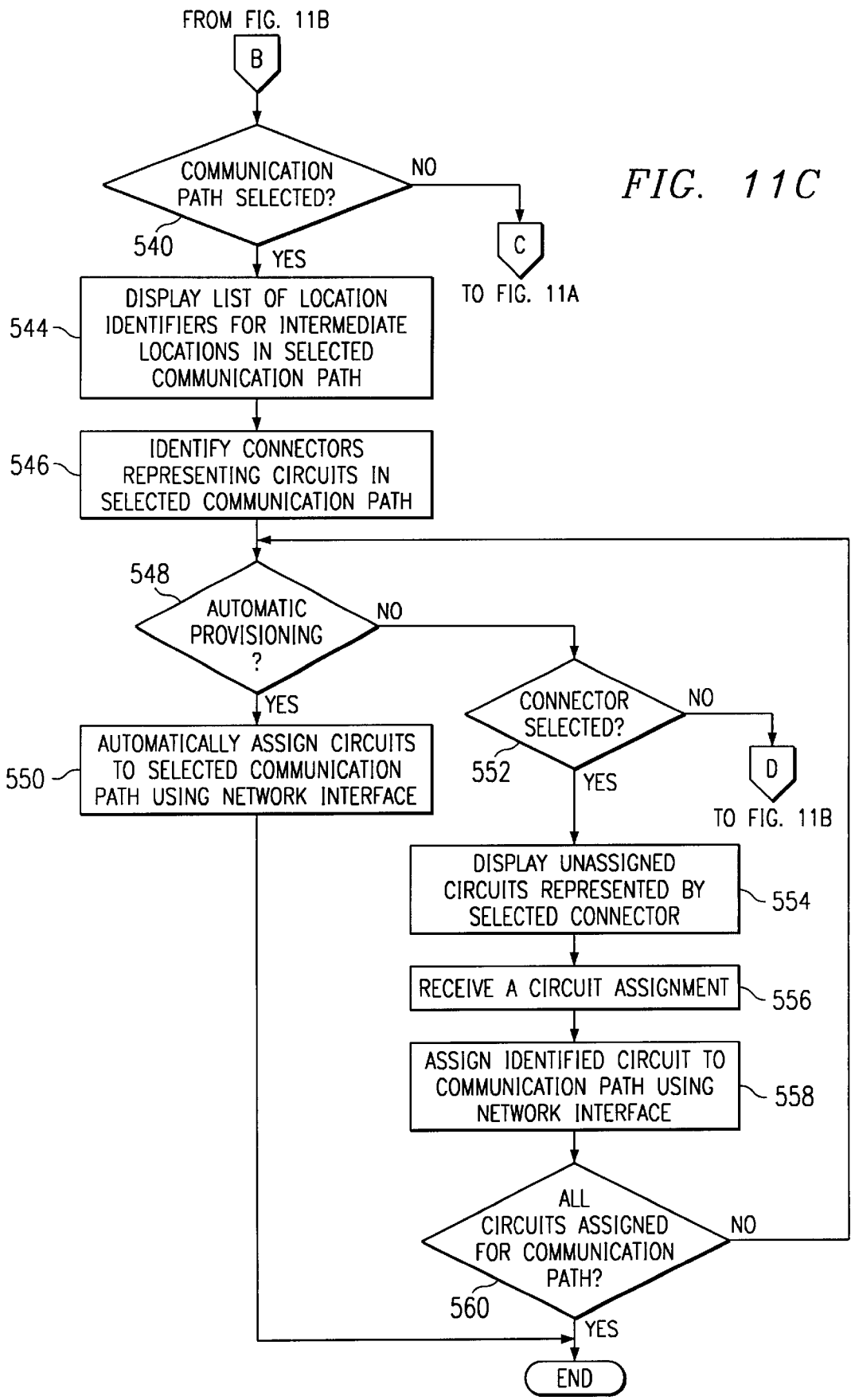

FIG. 11 is a flow chart of an exemplary method of analyzing communication paths in network 12. Processor 15 of computer 16 implements the described method by executing program 24. The method begins at step 500, where processor 15 receives target circuit information and boundary information. As described above, the target circuit information specifies two locations 20 and a rate code. Using the boundary information, processor 15 defines boundary area 152 at step 502 and identifies locations 20 and circuits 22 associated with defined boundary area 152 at step 504. At step 506, processor 15 displays, in graphics window 158, nodes 164 and connectors 166 representing identified locations 20 and circuits 22. Processor 15 provides a geographic background for the configuration of nodes 164 and connectors 166 at step 508.

A number of options may be selected at steps 510–515. Although step 510–515 are displayed in a serial manner, program 24 may implement steps 510–515 in a parallel fashion so that any of the described steps may be selected at any point during program 24. If one of nodes 164 is selected in graphics window 158 at step 510, processor 15 displays, in information window 162, text information identifying location 20 represented by selected node 164 at step 516. If one of connectors 166 is selected in graphics window 158 at step 511, processor 15 displays, in information window 162, text information identifying one or more circuits 22 represented by selected connector 166 at step 518. If a precision level is selected at step 512, processor 15 stores the selected precision level at step 520. If new target information is selected at step 513, processor 15 stores the selected target information at step 522. If new boundary information is selected at step 514, processor 15 stores the selected boundary information at step 524, and the method returns to step 502. If path analysis is selected at step 515, processor 15 identifies a series of circuits 22 coupled between two locations 20 specified by the target circuit information at step 528, and the method continues at step 530. Otherwise, the method returns to step 510.

If processor 15 determines that the identified series of circuits 22 satisfies the rate code (at step 530) and the precision level (at step 532), processor 15 adds the series of circuits 22 to a list of valid communication paths at step 534. At step 536, processor 15 attempts to identify another series of circuits 22 coupled between locations 20 specified by the target circuit information. If processor 15 identifies another series of circuits 22, the method returns to step 530 so that processor 15 may determine whether the new series of circuits 22 qualifies as a valid communication path between locations 20. If processor 15 does not identify another series of circuits 22, processor 15 displays the list of identified communication paths at step 537.

A number of options may be selected at steps 538–540. Although step 538–540 are displayed in a serial manner, program 24 may implement steps 538–540 in a parallel fashion so that any of the described steps may be selected. If a sort criteria is selected at step 538, processor 15 sorts the communication paths according to the selected sort criteria at step 541. In a particular embodiment, processor 15 sorts the list of communication paths according to costs, number of leased circuits 22, number of wholly-owned circuits 22, or any other suitable criteria. In an alternative embodiment, processor 15 automatically sorts the list of communication paths in ascending order according to a number of circuits 22 in each communication path. If a filter criteria is selected at step 539, processor 15 filters the communication paths according to the selected filter criteria at step 542. In a particular embodiment, processor 15 filters the communication paths to identify and display communication paths that include specified location 20 or circuit 22. If a communication path is selected at step 540, the method continues at step 544; otherwise, the method returns to step 510.

At step 544, processor 15 displays, in information window 162, a list of location identifiers for intermediate locations 20 in the selected communication path. Processor 15 also identifies, in graphics windows 158, one or more connectors 166 representing circuits 22 in the selected communication path at step 546. If automatic provisioning is selected at step 548, processor 15 automatically assigns one or more available circuits 22 to the selected communication path at step 550, and the method ends. In a particular embodiment; processor 15 communicates provisioning information to remotely configurable equipment using network interface 13. If one of connectors 166 is selected at step 552, the method continues at step 554; otherwise, the method returns to step 537, so that another of the identified communication paths may be selected. At step 554, processor 15 displays circuit assignment window 400 listing unassigned circuits 22 represented by selected connector 166. Processor 15 receives, from a user, a circuit assignment identifying one of unassigned circuits 22 at step 556 and assigns identified circuit 22 to the communication path using network interface 13 at step 558. At step 560, processor 15 determines whether a user has assigned at least one circuit 22 for each connector 166 representing the communication path. If a user has not assigned at least one circuit 22 for each connector 166, the method returns to step 548, so that a user may provision the rest of the selected communication path. If processor 15 determines that a user has assigned at least one circuit 22 for each connector 166 representing the communication path, the method ends.

Although an embodiment of the invention and its advantages are described in detail, a person skilled in the art could make various alterations, additions, and omissions with departing from the spirit and scope of the present invention as defined by the appended claims.

What is claimed is:

1. A system for analyzing communication paths in a telecommunications network, comprising:

a memory operable to store network data relating to a plurality of circuits in a telecommunications network; and a processor coupled to the memory and operable to receive target circuit information specifying two telecommunication locations and a rate code, the processor further operable to identify one or more circuits associated with a defined boundary area and to identify one or more communication paths between the specified telecommunication locations, each communication path comprising one or more of the identified circuits that communicate information according to the rate code.

2. The system of claim 1, wherein the rate code specifies a classification level in a Digital Signal hierarchy, an Optical Carrier hierarchy, a Synchronous Transport Signal hierarchy, or a Virtual Tributary hierarchy.

3. The system of claim 1, wherein the processor is further operable to define the boundary area to enclose search areas around the telecommunication locations.

4. The system of claim 3, wherein the search areas are circular and the boundary area is rectangular.

5. The system of claim 1, wherein the processor identifies a circuit as associated with the defined boundary area if the circuit is positioned within the boundary area according to geographic coordinates.

6. The system of claim 1, wherein the processor identifies a plurality of synchronous optical network (SONET) circuits as associated with the defined boundary area if at least one of the SONET circuits is positioned within the boundary area according to geographic coordinates.

7. The system of claim 1, wherein the processor identifies a series of circuits as a communication path if adjacent circuits within the series couple to remotely configurable equipment.

8. The system of claim 1, wherein the processor identifies a series of circuits as a communication path if adjacent circuits within the series have matching common language location identifiers (CLLIs).

9. The system of claim 1, wherein the processor is further operable to identify communication paths that include a specified intermediate location.

10. The system of claim 1, wherein the processor is further operable to identify communication paths that include a specified circuit.

11. The system of claim 1, further comprising a network interface coupled to the telecommunications network and operable to communicate provisioning information to assign one or more circuits to a selected communication path.

12. The system of claim 1, further comprising a network interface coupled to the telecommunications network and operable to communicate provisioning information to remotely configurable equipment to assign one or more circuits to a selected communication path.

13. A program embodied in a computer-readable medium for analyzing communication paths in a telecommunications network, the program comprising:

a display component operable to generate a graphic representation of nodes and connectors, each node representing a telecommunication location, each connector coupled between two of the nodes and representing one or more circuits coupled between telecommunication locations; and a processing component operable to receive target circuit information specifying two telecommunication locations and a rate code, the processing component further operable to identify one or more communication paths between the specified telecommunication locations, each communication path comprising one or more circuits that communicate information according to the rate code.

14. The program of claim 13, wherein the rate code specifies a classification level in a Digital Signal hierarchy, an Optical Carrier hierarchy, a Synchronous Transport Signal hierarchy, or a Virtual Tributary hierarchy.

15. The program of claim 13, wherein the display component is further operable to generate at least one connector with a display characteristic indicating a rate code or an ownership status of a circuit represented by the connector.

16. The program of claim 13, wherein the display component is further operable to display a geographic background identifying a geographic feature or a geographic-based telecommunications feature.

17. The program of claim 13, wherein the display component is further operable to generate a list of the identified communication paths sorted in ascending order according to a number of circuits in each communication path.

18. The program of claim 13, wherein the display component is further operable to generate, in response to a user selecting a connector representing a circuit, a first location identifier assigned to a first telecommunication location coupled to the circuit, a second location identifier assigned to a second telecommunication location coupled to the circuit, and a rate code associated with the circuit.

19. The program of claim 18, wherein the first and second location identifiers are common language location identifiers (CLLIs) and the rate code is a classification level in a Digital Signal hierarchy, an Optical Carrier hierarchy, a Synchronous Transport Signal hierarchy, or a Virtual Tributary hierarchy.

20. The program of claim 13, wherein the processing component identifies a series of circuits as a communication path if adjacent circuits within the series couple to remotely configurable equipment.

21. The program of claim 13, wherein the processing component identifies a series of circuits as a communication path if adjacent circuits within the series have matching common language location identifiers (CLLIs).

22. The program of claim 13, wherein the processing component is further operable to identify communication paths that include a specified intermediate location.

23. The program of claim 13, wherein the processing component is further operable to identify communication paths that include a specified circuit.

24. The program of claim 13, wherein the processing component identifies communication paths that include one or more circuits associated with a specified geographic boundary area.

25. The program of claim 24, wherein the processing component is further operable to define the boundary area to enclose search areas around the specified telecommunication locations.

26. The program of claim 25, wherein the search areas are circular and the boundary area is rectangular.

27. The program of claim 24, wherein the processing component identifies a circuit as associated with the defined boundary area if the circuit is positioned within the boundary area according to geographic coordinates.

28. The program of claim 24, wherein the processing component identifies a plurality of synchronous optical network (SONET) circuits as associated with the defined boundary area if at least one of the SONET circuits is positioned within the boundary area according to geographic coordinates.

29. The program of claim 13, wherein the processing component is further operable to communicate provisioning information to assign one or more circuits to a selected communication path.

30. The program of claim 13, wherein the processing component is further operable to communicate provisioning information to remotely configurable equipment to assign one or more circuits to a selected communication path.

31. A method of analyzing communication paths in a telecommunications network, comprising:
receiving target circuit information specifying two telecommunication locations and a rate code;
defining a boundary area in the telecommunications network;
identifying one or more circuits associated with the defined boundary area; and
identifying one or more communication paths between the specified telecommunication locations, each communication path comprising one or more of the identified circuits operable to communicate information according to the rate code.

32. The method of claim 31, wherein the rate code specifies a classification level in a Digital Signal hierarchy, an Optical Carrier hierarchy, a Synchronous Transport Signal hierarchy, or a Virtual Tributary hierarchy.

33. The method of claim 31, further comprising:
defining search areas around the specified telecommunication locations; and
defining the boundary area to enclose the search areas.

34. The method of claim 33, wherein the search areas are circular and the boundary area is rectangular.

35. The method of claim 31, further comprising identifying a circuit as associated with the defined boundary area if the circuit is positioned within the boundary area according to geographic coordinates.

36. The method of claim 31, further comprising identifying a plurality of synchronous optical network (SONET) circuits as associated with the defined boundary area if at least one of the SONET circuits is positioned within the boundary area according to geographic coordinates.

37. The method of claim 31, further comprising identifying a series of circuits as a communication path if adjacent circuits within the series couple to remotely configurable equipment.

38. The method of claim 31, further comprising identifying a series of circuits as a communication path if adjacent circuits within the series have matching common language location identifiers (CLLIs).

39. The method of claim 31, further comprising identifying communication paths that include a specified intermediate location.

40. The method of claim 31, further comprising identifying communication paths that include a specified circuit.

41. The method of claim 31, further comprising communicating provisioning information to assign one or more circuits to a selected communication path.

42. The method of claim 31, further comprising communicating provisioning information to remotely configurable equipment to assign one or more circuits to a selected communication path.

43. A method for analyzing communication paths in a telecommunications network, the method comprising:
displaying a plurality of nodes and connectors, each node representing a telecommunication location, each connector coupled between nodes and representing one or more circuits coupled between telecommunication locations;
receiving target circuit information specifying two telecommunication locations and a rate code; and
identifying one or more communication paths between the specified telecommunication locations, each communication path comprising one or more circuits operable to communicate information according to the rate code.

44. The method of claim 43, wherein the rate code specifies a classification level in a Digital Signal hierarchy, an Optical Carrier hierarchy, a Synchronous Transport Signal hierarchy, or a Virtual Tributary hierarchy.

45. The method of claim 43, further comprising generating at least one connector with a display characteristic indicating a rate code or an ownership status of a circuit represented by the connector.

46. The method of claim 43, further comprising displaying a geographic background identifying a geographic feature or a geographic-based telecommunications feature.

47. The method of claim 43, further comprising displaying a list of the identified communication paths sorted in ascending order according to a number of circuits in each communication path.

48. The method of claim 43, further comprising displaying, in response to a user selecting a connector representing a circuit, a first location identifier assigned to a first telecommunication location coupled to the circuit, a second location identifier assigned to a second telecommunication location coupled to the circuit, and a rate code relating to a bandwidth of the circuit.

49. The method of claim 48, wherein the first and second location identifiers are common language location identifiers (CLLIs) and the rate code is a classification level in a Digital Signal hierarchy, an Optical Carrier hierarchy, a Synchronous Transport Signal hierarchy, or a Virtual Tributary hierarchy.

50. The method of claim 43, further comprising identifying a series of circuits as a communication path if adjacent circuits within the series couple to remotely configurable equipment.

51. The method of claim 43, further comprising identifying a series of circuits as a communication path if adjacent circuits within the series have matching common language location identifiers (CLLIs).

52. The method of claim 43, further comprising identifying communication paths that include a specified intermediate location.

53. The method of claim 43, further comprising identifying communication paths that include a specified circuit.

54. The method of claim 43, further comprising identifying one or more communication paths that include one or more circuits associated with a specified geographic boundary area.

55. The method of claim 54, further comprising defining the boundary area to enclose search areas around the specified telecommunication locations.

56. The method of claim 55, wherein the search areas are circular and the boundary area is rectangular.

57. The method of claim 54, further comprising identifying a circuit as associated with the defined boundary area if the circuit is positioned within the boundary area according to geographic coordinates.

58. The method of claim 54, further comprising identifying a plurality of synchronous optical network (SONET)

circuits as associated with the defined boundary area if at least one of the SONET circuits is positioned within the boundary area according to geographic coordinates.

59. The method of claim 43, further comprising communicating provisioning information to assign one or more circuits to a selected communication path.

60. The method of claim 43, further comprising communicating provisioning information to remotely configurable equipment to assign one or more circuits to a selected communication path.

* * * * *